United States Patent
Williams

(10) Patent No.: US 7,325,095 B2
(45) Date of Patent: Jan. 29, 2008

(54) DATA STORAGE ORGANIZATION FOR DISTRIBUTED COMPUTING IN AN INTELLIGENT DISK DRIVE

(75) Inventor: Larry Lynn Williams, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 430 days.

(21) Appl. No.: 11/069,285

(22) Filed: Feb. 28, 2005

(65) Prior Publication Data

US 2006/0193074 A1    Aug. 31, 2006

(51) Int. Cl.
*G06F 12/00* (2006.01)

(52) U.S. Cl. .................. 711/112; 711/100; 711/101; 711/111

(58) Field of Classification Search ............... None
See application file for complete search history.

(56) References Cited

U.S. PATENT DOCUMENTS

| | | | |
|---|---|---|---|
| 5,659,801 | A | 8/1997 | Kopsaftis |
| 6,285,999 | B1 | 9/2001 | Page |
| 6,421,779 | B1 | 7/2002 | Kuroda et al. |
| 6,799,176 | B1 | 9/2004 | Page |
| 2002/0162075 | A1 | 10/2002 | Talagala et al. |
| 2003/0227703 | A1 | 12/2003 | Hinshaw |
| 2004/0228533 | A1 | 11/2004 | Adelmann |
| 2004/0243745 | A1 | 12/2004 | Bolt et al. |

*Primary Examiner*—Reginald Bragdon
*Assistant Examiner*—Mehdi Namazi
(74) *Attorney, Agent, or Firm*—G. Martin Knight

(57) ABSTRACT

An intelligent disk drive is described which includes means for executing distributed computing tasks including a CPU and associated memory. The communication interface with the host computer is modified to allow the host computer to send executable code for a task to the drive and to allow the drive to communicate the results and status information about the task to the host computer. A method of organizing data for distributed processing in the intelligent disk drive is described which utilizes physical placement of the data around the rotating disk to optimize the execution of the task. In one embodiment head switching is used as further optimization in a disk drive having a plurality of heads to implement alternatives in the task program. In another embodiment, the intelligent disk drive has means for reading from at least one or more heads simultaneously while writing to another head.

30 Claims, 10 Drawing Sheets

DATA STORAGE ORGANIZATION FOR DISTRIBUTED COMPUTING IN AN INTELLIGENT DISK DRIVE

FIELD OF THE INVENTION

The invention relates to data storage devices such as disk drives with, the architecture of the communication interface between the data storage devices and host computer and more particularly to methods and means for executing programs on the data storage device to implement distributed computing processes.

BACKGROUND OF THE INVENTION

The invention described herein is concerned with the implementation of distributed computing processes using a new disk file architecture such that distributed processing can be applied to tasks on a much broader scale than has previously been available. In general, the term distributed processing as used herein includes parallel processing as a special case of the simultaneous use of multiple computers resources to solve a computational problem. The resources can range from a single "computer" with multiple processors to an arbitrary number of computers connected to a network, or some combination of those. Parallel computing is advantageous to those tasks that can be broken apart into discrete tasks that can be solved simultaneously. Such systems with more than one computer can execute multiple programs at the same moment, and reach a result faster than would be possible with a single computer resource. Currently parallel computing has been applied to very large problems such as planetary orbits, weather prediction, ocean current patterns, tectonic plate drift, chemical and nuclear reactions, biological prediction such as the human genome activity and the such which can only be solved with very large (and very expensive) parallel computers. As the cost of parallel computing comes down, less spectacular problems can also be solved faster and cheaper with parallel processing systems. These applications include rush hour traffic, assembly line control, daily business operations, mechanical simulation such as bending of complex plates and thermal distribution, complex circuit simulation, parallel databases, data mining, oil exploration, web search engines, computer-aided medical diagnosis, advanced graphics and virtual reality, networked video, and the like.

The fundamental reason for utilizing distributed and parallel computing is to solve problems faster and cheaper. Some applications must be done in real time (such as missile defense and guidance systems), other tasks are so complex that the only currently practical solution is parallel computing. Included in these applications are high-speed wide area network applications where speed is the principal objective. Some applications have non-local resources such as wide-area weather forecasting where parallel computing is the only practical solution. Of course, many of these applications can be done, given sufficient time, with a single, expensive super-computer. But utilizing multiple slower (and cheaper) systems is a much more economical solution. Since communication speed is limited by the speed of light, super computers are forced to move their components closer and closer together to achieve higher speeds. Not only are there limitations to the affordable miniaturization, the impact on cooling and electrical interference are difficult to overcome.

Currently, most super computers and networked parallel computers use a multiple-instruction, multiple-data computing architecture. Each processor may be executing a different instruction stream and may be executing a different instruction team. An example of this application is the computation of the temperature distribution in a complex machine. The physical machine can be conceptually subdivided in into a multiplicity of small nearly infinitesimal cubes in which the boundary conditions in each cube are initially known. The physical characteristics of the cubes may differ; some contain air (and the movement of the air in the cube), others may contain metal or plastic parts in which the contents do not change appreciably, but where the thermal characteristics are quite different that those cubes containing a gas or a fluid. Once the initial conditions are known, the predicted conditions at the next increment of time can be computed, and the boundary conditions of each cube are computed. At this point the boundary conditions on the interface between two small cubes may be different. Suppose, for example, the boundary between cube C1 and C2 is B1 and the initial temperature of the boundary B1 is T1. Based on all of the boundaries of B1, a new temperature at B1 is established. At the same time, a the conditions in C2 result is a new temperature at B1 which, in the general case, is not the same as that found by solving the boundary problem in B1. A simple algorithm is to average the two predicted conditions at either side of B1. Once this is completed for all the interfaces of all the cubes in the problem, the task is restarted. This continues until the temperature at B1 reaches a stable value. This same process is repeated for all six boundaries of each of the cubes that describe the complex machine. Once a stable condition is arrived at, the process restarts for the next increment of time.

In an architecture that describes the preceding taxonomy a set of computers, with their associated memories, is connected through some network. In the multiple-instruction, single-data taxonomy, only one computer would have an associated memory, and possibly that computer would only be used only to communicate with the other computers. In the multiple-instruction, multiple-data system, each computer would process the data in it's associated memory (possibly using the instructions in it's memory) and communicate the results of those computations over the network to other computers in the array.

In a few applications, high-speed volatile memory (such as RAM) is sufficient for the task. But in most complex applications a mass storage system (such as a disk drive or similar technology) is required. Each processor in the array has not only the associated RAM memory, but also an associated mass storage. The interface between the CPU and the mass storage can be any of the large set of computer interfaces such as SCSI, an IDE, of fiber channel. Now the array can process a large problem, but the addition of the mass storage also contributes to overhead, the known limitation of parallel processing.

In an early work (1967), Amdahl is credited with having shown that the principal limitation to a parallel processing system is overhead. This overhead increases with the number of effective parallel processors. In addition, the time required to store and retrieve data from mass storage such as a disk drive is a real world factor. Most of the computational time (the so called "observed speed up time") is taken by fetching instructions and data from the mass storage. In the case of a SCSI interface, the CPU sends a command through the interface to the storage unit to fetch a particular block of data, the disk drive interprets the command, inserts the command in it's associated command stack if it is processing other requests, and when the command finally reaches the top of the stack, the disk drive positions the head over the appropriate physical address on the disk and reads the requested data into it's buffer. The data is sent back to the CPU through the interface. This process continues until the request is complete and the disk drive then executes the next request in the stack.

Many have voiced the contention that the organization of a single computer has reached its limits and that truly significant advances can be made only by interconnection of a multiplicity of computers in such a manner as to permit cooperative solution. The nature of this overhead (in parallelism) appears to be sequential so that it is unlikely to be amenable to parallel processing techniques. Overhead alone would then place an upper limit on throughput as a small multiple of the sequential processing rate, even if the housekeeping were done in a separate processor. So the fundamental limitation on a parallel computing system is not the speed of the actual computations but the overhead.

In many applications the speed required to arrive at a decision is extremely critical. The literature is replete with applications that require computational speeds faster than those available with available processors and storage systems. For example, one could consider a missile tracking system where a decision must be made very quickly on whether to respond to a perceived attack. Another application is high-speed packet switching where a decision must be made where to send a packet before another one arrives.

One approach to this bottleneck is to partition the application into several parts and then compute each independently and assembling the overall solution later from the collection of partial solution. The problem with this approach is that the speed of an array of computers is limited by the overhead inherent in each of the computers. Rajkumar Buyya in "High Performance Cluster Computing, Architectures and Systems, Volume 1", 1999) has written that: "Improvements in disk access time have not kept pace with microprocessor performance, which has been improving by 50 percent or more per year." Overall improvement in disk access times, which involve mechanical systems, has been less than 10 percent per year. So-called "grand challenge" applications usually need to process large amounts of data. The system throughput is limited by the slowest system component which is often the disk drive. Clearly a fundamental limitation with high-speed parallel processing is the speed at which information can be retrieved from the storage system. For small applications, the storage may be a simple electronic memory (RAM and the like), but for large applications a mass storage system is necessary.

Generally random access disk files have been used for mass storage, but they are limited by some the physical characteristics of the mechanical system. As recording heads and magnetic read heads have become smaller, the amount of data that can be stored on a rotating disk has increased. Consequently, the data rate of disk drives has increased with increases in associated electronic components. However neither the rotational speed nor the time required to access the appropriate track have significantly improved. The principal bottleneck in using a parallel processing architecture in an application where the volume of data requires disk drives is the overhead of accessing the data.

The layout of a typical set of disks is illustrated in FIG. 7. Three disks 45A, 45B, 45C are shown, but any number of disks can conceivably be used. The disks are rigidly mounted on a spindle (not shown) so that the relative position of each disk to the other disks does not change as the entire disk pack is rotated. The upper and lower surface of each disk can be used to record data. Typically the heads (not shown) are mechanically connected to a single actuator, so that the heads all move in unison. Between the outer 51A and inner diameter 52A of disk 45A are the plurality of concentric tracks such as the exemplary track 53A which is shown. Each track is conventionally subdivided into blocks, commonly 512 or 528 bytes each. The blocks are typically integral units which include ECC bytes which cover the entire block and, therefore, each block can is read or written as a unit. In current disk drives, the number of blocks in a track ranges from over 800 in the outer track to less than 600 on the inner track. There are commonly over 41,000 tracks on each surface. For some of the more advanced disk drives, the rotational speed is 15,000 RPM (or 4 ms. per revolution). The time required to move the head from one track to another can range from a low of 0.3 ms. for a single track seek, up to 6 ms. for a maximum seek from the outer track to the inner track.

Prior art data storage devices such as disk drives have drive control systems include means for accepting commands from a host computer including commands related to self-testing, calibration and power management. Each drive has programming code (microcode) in nonvolatile memory for execution by a controller, which is a special purpose processor, to enable it to perform essential functions. The microcode can be updated through the drive's communication interface as described, for example, in U.S. Pat. No. 5,659,801 to Kopsaftis. Various standard communication interfaces with both hardware components and command protocols are commonly used such as IDE, SCSI, Serial ATA, and Fibre Channel Arbitrated Loop (FC-AL).

Commercially available disk drives cannot perform any operation on the data other than those directly related to its storage such as, for example, performing error correction computations. There have been some suggestions for enhancing disk drives (HDD) by adding an application-specific component for receiving and executing application-specific instructions. Published U.S. patent application 20030227703 by F. D. Hinshaw, describes application-specific components which can perform application-specific tasks, such as database operations, using data on the HDDs and return results to a local host or even a remote host via a network. Examples of the application-specific components include a circuit board or an integrated circuit such as an Application Specific Integrated Circuit (ASIC), Field Programmable Gate Array (FPGA), Central Processing Unit (CPU), or Digital Signal Processor (DSP). The additional component is capable of receiving application-specific instructions via a standard network connection and executing these application-specific instructions on the data contained on the disks. The application-specific component may be in the form of an add-on board which couples to the controller circuit or, alternatively, in the form of an application-specific chip which mates with a socket provided on the controller circuit.

In U.S. patent application 20020162075 by Talagala, et al. a storage system is described which includes a storage array controller and a storage array. The storage array controller issues scrubbing operation commands to one or more of the disk drive controllers. In response, each disk drive controller that receives a scrubbing operation command reads data from within a data range from at least one of the disk drives, calculates a new checksum for the data, and compares the new checksum to a preexisting checksum for the data. If the new checksum doesn't equal the preexisting checksum, the data within the data range is determined to be erroneous.

SUMMARY OF THE INVENTION

An intelligent disk drive is described which includes means for executing distributed computing tasks. A CPU, program code and associated memory are included in the intelligent disk drive to implement the distributed task capability. The communication interface with the host computer is modified to allow the host computer to send executable code for a task to the drive and to allow the drive to communicate the results and status information about the task to the host computer. In a preferred embodiment the disk drive has a task control program, task program code, task data and status information for the distributed task. The task control program implements the basic task management functions of storing the task program, reporting results and saving progress information to allow the task to be interrupted by other drive functions. In alternative embodiments, the disk drive can communicate with other similar disk drives in the bus to provide the results of computation to the other processors. The disk storage, RAM memory, and processor are intimately connected so that the exact location of the required data and program instructions are known. This architecture requires fewer resources than the previous architecture because each series of instructions and set of data can be fetched immediately as required by the CPU rather than loading complete files to the CPU over the interface.

In a preferred embodiment a method of organizing data for distributed processing in the intelligent disk drive is described which utilizes physical placement of the data around the rotating disk to optimize the execution of the task. In one embodiment head switching is used as further optimization in a disk drive having a plurality of heads to implement alternatives in the task program. In this embodiment alternative blocks of data or program code are placed at comparable physical locations on separate disk surface and the task program then selects which of the alternative blocks to read by a high-speed head switch operation.

In another preferred embodiment, the intelligent disk drive has means for reading from at least one head while simultaneously writing to another head. The task program, then performs operations on the input data stream and then writing the output without having to move an actuator. This embodiment minimizes the actuator movement required for processing streams of data.

DETAILED DESCRIPTION OF THE INVENTION AND THE PREFERRED EMBODIMENTS

Figure 1:
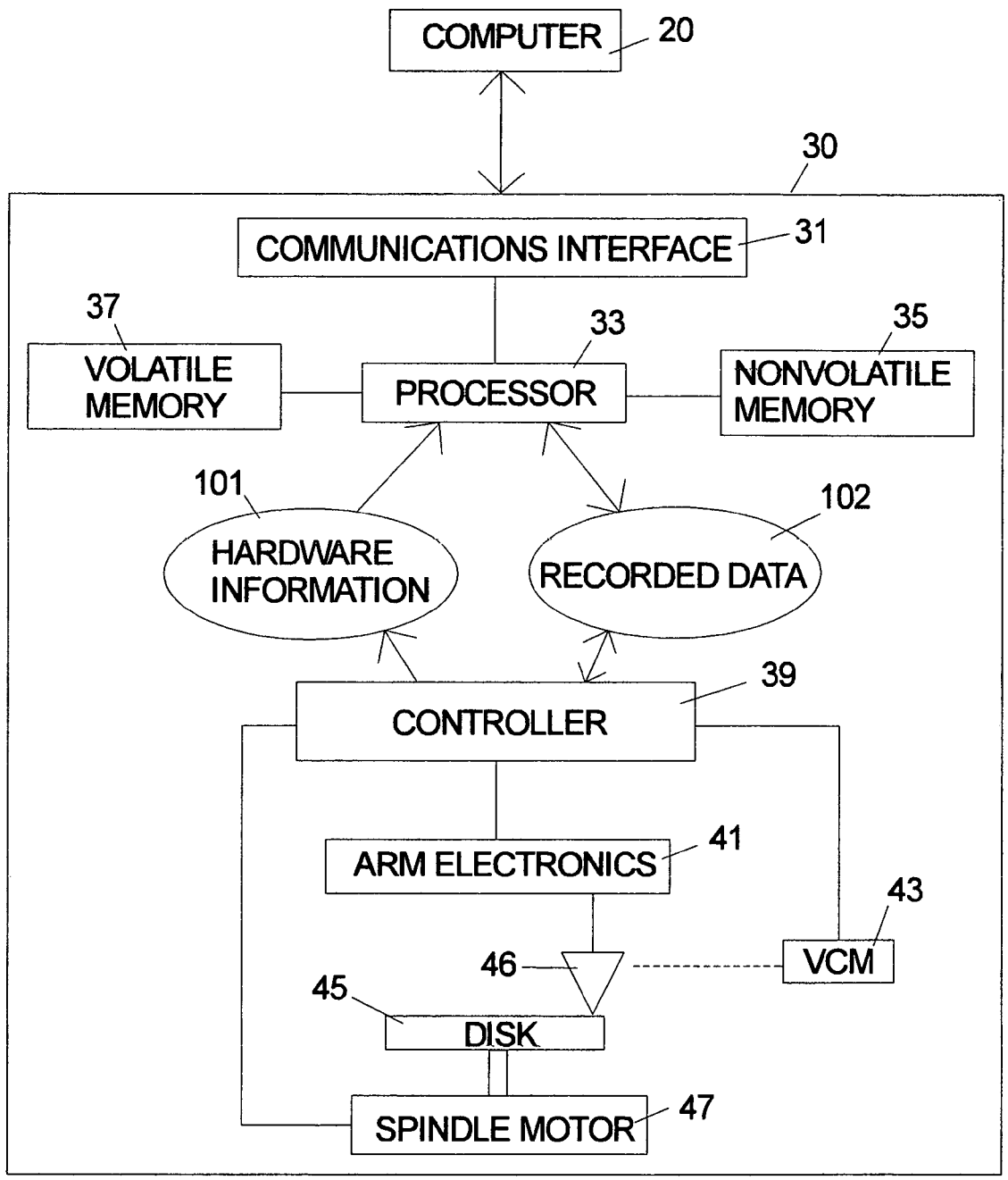
FIG. 1 is an illustration of selected components of a disk drive according to the invention.

FIG. 1 is a symbolic illustration of a disk drive 30 according to the invention which will be called an "intelligent disk drive." Information, commands, data, etc. flow back and forth between the host computer 20 and the disk drive 30 through communications interface 31 which can be any prior art hardware interface. The disk drive includes a general purpose microprocessor 33 which accesses both volatile memory 37 and nonvolatile memory 35. The program code for the microprocessor 33 can be stored in either the volatile memory 37 or nonvolatile memory 35. The program code can originate in the nonvolatile memory 35 in the form of a preprogrammed device such as an EEprom. The program code can also originate from the host computer 20. The disk drive 30 is shown as including a separate controller 39, but in an alternative embodiment the microprocessor can be designed to handle all of the tasks normally performed by a controller and the controller can be omitted. The arm electronics 41, voice coil motor (VCM) 43, disk 45, spindle motor 47 and head 46 are according to the prior art. In each embodiment the microprocessor has access to the hardware information 101 which includes detailed information about the state of the components which can be used to optimize the execution of the special purpose tasks which are defined herein. The recorded data 102 is the standard data which is stored on and retrieved from the disk drive.

Figure 2:
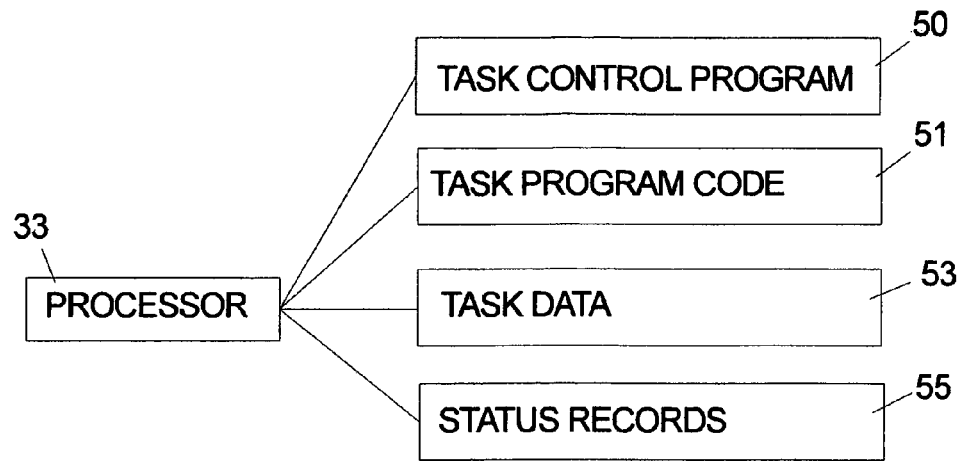
FIG. 2 is an illustration of distributed task data organization in a disk drive according to an embodiment of the invention.

The disk drive according to the invention is designed to execute distributed and/or parallel computing tasks. FIG. 2 illustrates the organization of the program and data used by the processor 33 for the task. In the embodiment described herein the disk drive has a task control program 50, task program code 51, task data 53 and status information for the distributed task 55. The task control program 50 can be loaded into memory from the disk at startup or stored in nonvolatile storage. The task control program 50 implements the basic task management functions of storing the task program, reporting results and saving progress information to allow the task to be interrupted by other drive functions. The prior art communications interfaces (IDE, SCSI, Serial ATA, Fibre Channel Arbitrated Loop (FC-AL), etc.) used between host computers and disk drives define a format through which the host can give commands and data to the disk drive. The invention can be implemented within the general framework of any of these systems with limited modifications which will described below. One modification according to the invention provides a method for the computer to send executable code and data defining a task to the disk drive for temporary or long term storage in volatile or nonvolatile memory or on the disk. Preferably the drive executes the task in the background to use otherwise free time to perform the task.

The basic command interface of the intelligent disk drive can be implemented in a variety of ways. Entirely new commands can be defined or existing commands can be modified. One particular embodiment to illustrate the invention will be described. In the prior art SCSI environment there are sufficient prior art commands to accomplish the task. However, in the preferred embodiment the intelligent disk drive must also act as an initiator rather than a simple slave. SCSI commands will be used as an example, but similar commands can be used for other interfaces such as IDE, Fiber Channel, etc. The SCSI communication link between the host and the disk drive uses a Command Descriptor Block (CDB). When the host sends a command down the SCSI BUS, each drive reads the command, but only that drive with the specific drive address. For example, the CDB a simple WRITE(6) command includes fields for:

operation code (0Ah)
    logical unit
    logical block address
    transfer length
    control The first Byte contains the operation code, the next three bits contain the SCSI unit (disk drive), the next byte is the length of the transfer, and the final byte contains various control information. Other commands may require more or less bytes for the command, but the structure is similar to the one shown. For a disk drive, a simple subset of the commands are:

FORMAT UNIT
LOCK UNLOCK CACHE
PRE-FETCH
READ(6)
READ(10)
READ DEFECT DATA
READ LONG
REASSIGN BLOCKS
RELEASE
RESERVE
REZERO UNIT
SEARCH DATA
SEARCH DATA EQUAL
SEARCH DATA HIGH
SEARCH DATA LOW
SEEK(6) AND SEEK(10)
SET LIMITS
START STOP UNIT
SYNCHRONIZE CACHE
VERIFY
WRITE(6)
WRITE(10)
WRITE AND VERIFY
WRITE LONG
WRITE SAME
SEND DIAGNOSTIC
RECEIVE DIAGNOSTIC

In the common usage of the SCSI standard, there is one "initiator" on the BUS and one or more slave devices. The slaves do not send instructions over the BUS unless they receive a request from the host. But the recent SCSI standard allows for multiple "initiators" on the same BUS which could be more than one host or the initiator could also be in the intelligent disk drive. In the following discussion it is assumed that the various hosts and the intelligent disk drives all have the capability to send or receive commands from any host or intelligent disk drive on the BUS.

Figure 3:
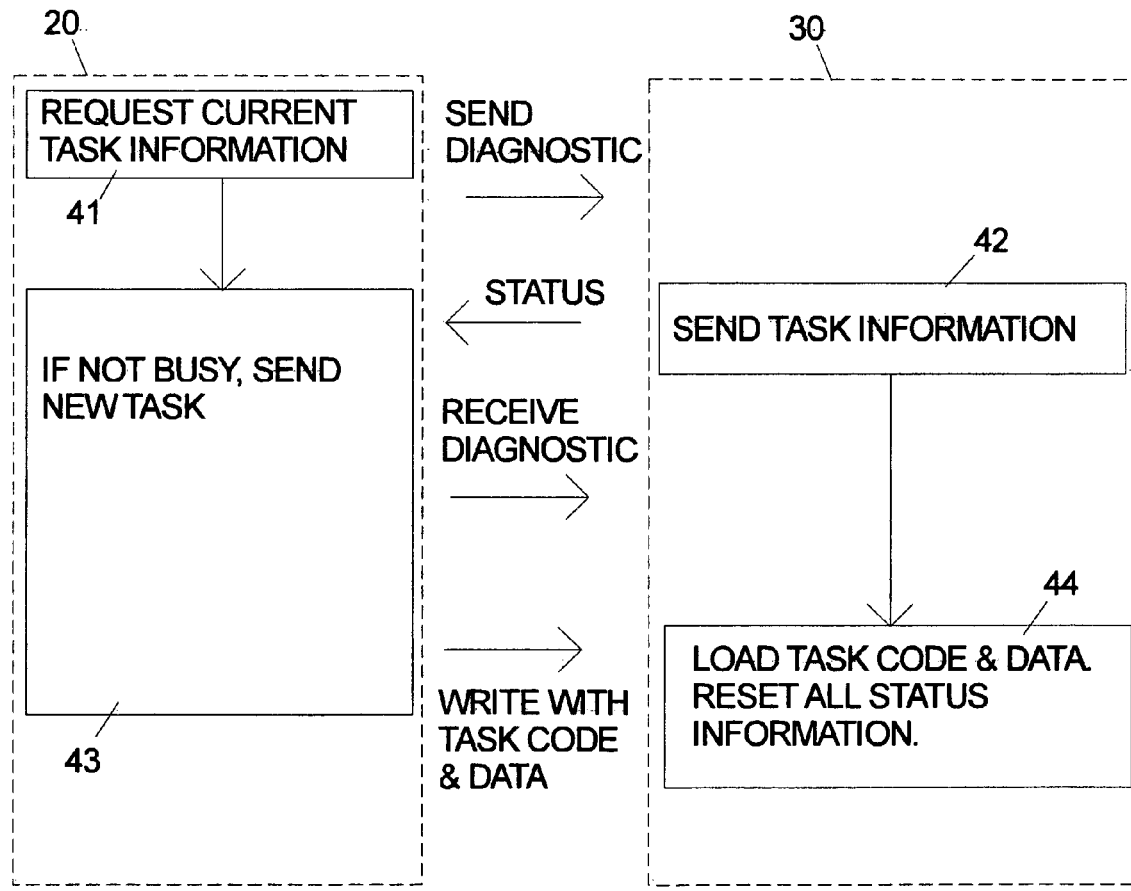
FIG. 3 is an illustration of an embodiment of the process of loading the task into a disk drive according to the invention.

The task program can conveniently be transmitted and updated through the SEND DIAGNOSTIC and RECEIVE DIAGNOSTIC commands as illustrated in FIG. 3. The host 20 can query the drive by sending a SEND DIAGNOSTIC command 41 to the disk drive. The intelligent disk drive responds by sending a block of information which includes information on the task currently defined 42. To define a new task, the host sends the intelligent disk drive a RECEIVE DIAGNOSTIC command to signal the drive to expect the task definition and then follows with a WRITE command that contains the definition of the task. The task definition can include the executable code for the task and the identity of the data. The executable code and data can be literally included in the data area of the write CDB or pointers can be used to specify data and code stored on the disk. The drive stores the task definition in the WRITE command as the new task program and initializes all of the status flags, pointers, etc. to indicate the starting point 44. In the case of multiple hosts, the intelligent disk drive optionally can accept task from only authorized hosts.

Once a distributed task is defined for the drive, the execution of the task proceeds according to the prior art multitasking computing techniques. The distributed task becomes one of potentially many things that the drive has to do. As known prior art, tasks are assigned a priority level to allocate the CPU resources. Preferably the distributed task is assigned a low priority so that it runs in the background without interfering with the standard disk drive functions.

Figure 4:
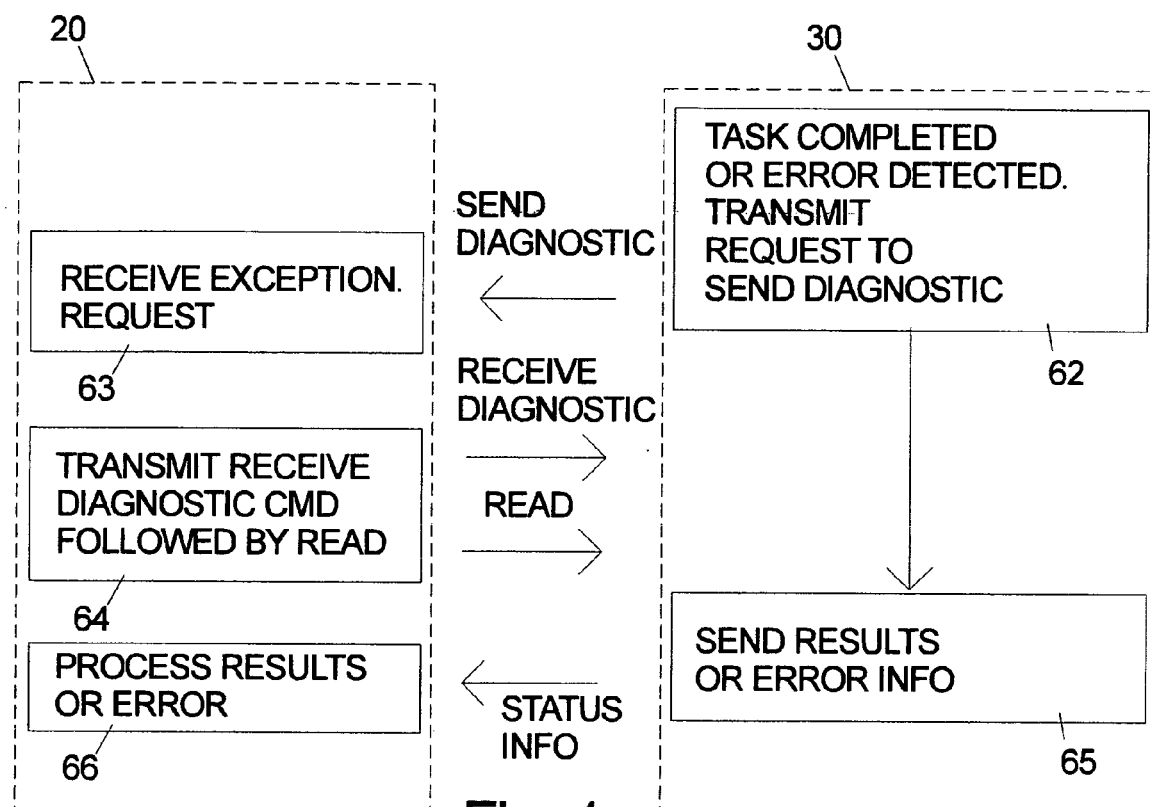
FIG. 4 is an illustration of an embodiment of the process of reporting task results from a disk drive to a host computer according to the invention.

When the disk drive needs to communicate information about the task to the host, the drive initiates a communication sequence by signaling the host (or hosts). The communication about the task could be an error message or a completion message. In one embodiment illustrated in FIG. 4 this is done by transmitting a SEND DIAGNOSTIC command 62, which is used in the prior art for error conditions, to indicate that a problem has been detected with the file the host has requested. In this embodiment the existing SEND DIAGNOSTIC protocol is modified to include means for communicating error conditions relating to the task and the results of the task. The host receives the SEND DIAGNOSTIC command as an exception 63. It continues the dialog by requesting the details by issuing a RECEIVE DIAGNOSTIC command to the intelligent disk drive followed by a READ command 64 which serves as a request for the status details and allows the drive to put relevant data in data area of the response to the read command. The intelligent disk drive interprets the sequence of commands as a command to transfer the task specific information to the host 65. Once the host has received the detailed information, it can decide upon appropriate further action such as sending a new task to the drive 66.

The communication interface is used only to communicate the results each computation to the host and optionally other processors in the array. The mass data storage, RAM memory, and task program are intimately connected such that the exact location of the required data and program instructions are known. This architecture requires fewer resources than the previous architecture because each series of instructions and set of data can be fetched immediately as required by the CPU rather than loading complete files to the CPU over the interface. For example, if a complete program, with it's associated branches requires 100 MB, but the current process only requires 1 MB of the code, only that portion of the instructions would be loaded and the remainder would remain on the mass storage until it was required. This architecture is a much faster implementation (the objective of parallel processing systems) while potentially limiting the cost. Thus a parallel processing task can be accomplished with less resources than one that has more overhead and consequently requires more processors and possible more time.

In contrast to the prior art disk drive architecture, the invention describes an architecture with a CPU and task control program inside the disk drive. Logically the CPU is positioned inside the SCSI or other interface so the hand shaking overhead necessary for communication over that interface is avoided for the actual task execution. The principal communication to the disk drive (mass storage) is only through the hard disk controller. On some applications, the hardware necessary for the CPU and the HDC may be merged.

In this implementation the CPU need only fetch the portions of the program that are currently necessary because the HDC can be programmed to keep other parts of the program available on mass storage as needed. It now has the ability to do "stream processing" in which each block of a large data stream (such as a video file) can be read, processes, and stored as the next block is being read. This architecture supports the most general parallel computing architecture described earlier, so any task that is amenable to parallel computing can be accomplished with an array of such disk drives. Even though there are several architectures for parallel computers, the architecture that contains the CPU inside the disk drive will support any one of the designs, and results in a simpler implementation that has higher speed because of the elimination of much of the overhead in a typical computer architecture. Although this architecture is advantageous in a single-instruction single-data application, it is even more advantageous in other architectures such as multiple-instruction multiple-data architectures where overhead is a significant part of the computational time.

There are many potential parallel processing applications. One is the so called atmospheric modeling which attempts to predict future weather based on current weather conditions. This effort is extremely important not only in prediction of catastrophic conditions such as tornados and hurricanes, but also determining places where the atmosphere is very unstable such as clear weather turbulence. One approach described in the literature is to subdivide the atmosphere in a region as a assembly of cubes.

Assume for this example that one intelligent disk drive in a parallel processing array is assigned to each cube of atmosphere. The SCSI interface currently limits the number of devices that can be addressed, but in principle an interface can designed to handle an unlimited number of devices. The conditions in each incremental cube are a function of the cube above, below, and to either side of the cube under consideration. In addition, we can consider one more cube in either horizontal direction. If we designate the central cube as cube (i,j), then the weather in this cube, $W_{(ij)}$, is a function of the movement of the atmosphere at that point, radiation at that location, convection, and precipitation in that area. Based on this, each intelligent disk drive may have a simple set of repetitive instructions as shown below. Although the problem is very complex, it can be segmented into a set of simple programs in each intelligent disk drive that represent one grid point. This is an example of a single-instruction multiple-data model described earlier.

Initialize Array
   Send initial conditions to each processor
   Receive initial conditions from other grid points
   Converge solution for all points in the grid
   Transmit converged solution to all grid points
   Increment time and repeat convergence A scenario for using a set or array of intelligent disk drives to work on this type of problem will be described. A host computer controls and coordinates the execution of the overall process and assigns the tasks to the intelligent disk drive. The task code in this application can be the same for each intelligent disk drive, but the data is unique for the particular cube. As described in general for FIG. 3, the host computer preferably sends an initial inquiry in the form of a SEND DIAGNOSTIC command to a drive and then receives the status information from the drive indicating whether among other things the execution of task is in progress. If the drive is not currently processing a task, then the host prepares the drive to accept the new task definition in a subsequent write command.

Figure 5:
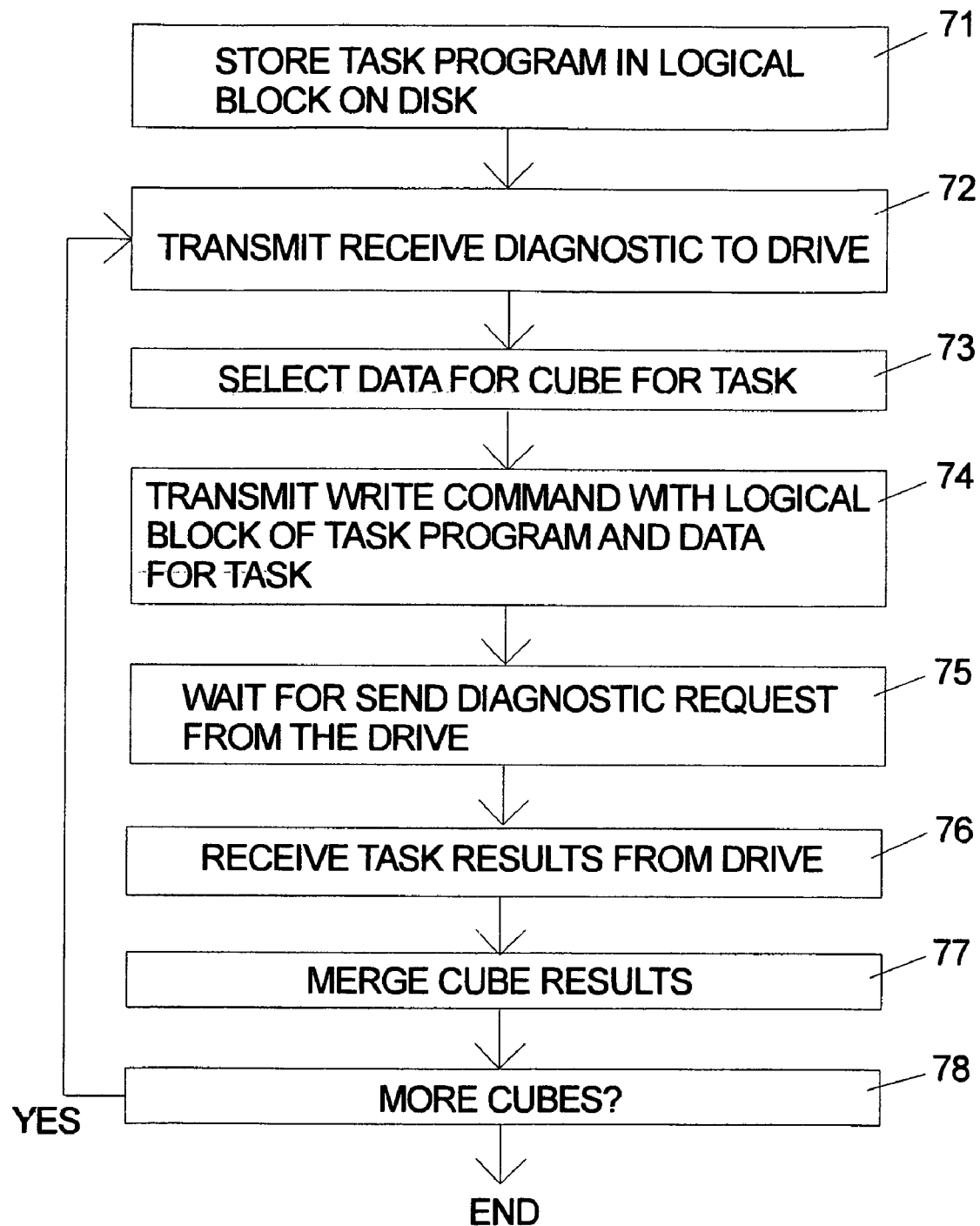
FIG. 5 is a flowchart illustrating the steps performed by a host to manage the task in the intelligent disk drive.

A flowchart illustrating the steps performed by a host to manage the task in the intelligent disk drive is given in FIG. 5. The executable code for the task can be transmitted to the drive and identified to the drive in a variety of ways. One alternative, shown in FIG. 5, is for the host to use standard write commands to write the task code to the disk 71. The host then transmits the RECEIVE DIAGNOSTIC command to the drive 72. The task data for the cube is selected 73. The write command which defines the task can then specify the logical block on the disk where the code was previously stored and sends the task data in-line 74. For a large block of code or one which is used repeatedly as in the present example, new code does not need to be sent to the drive to start each task. The host then waits for the drive to signal completion of the task with a SEND DIAGNOSTIC request 75. The results of the computations on the data are received 76 and merged with the other data from other drives 77. If more cubes are left to be processed, the host loops to the transmit step 72 to begin the process of starting the drive on a new cube.

Figure 6:
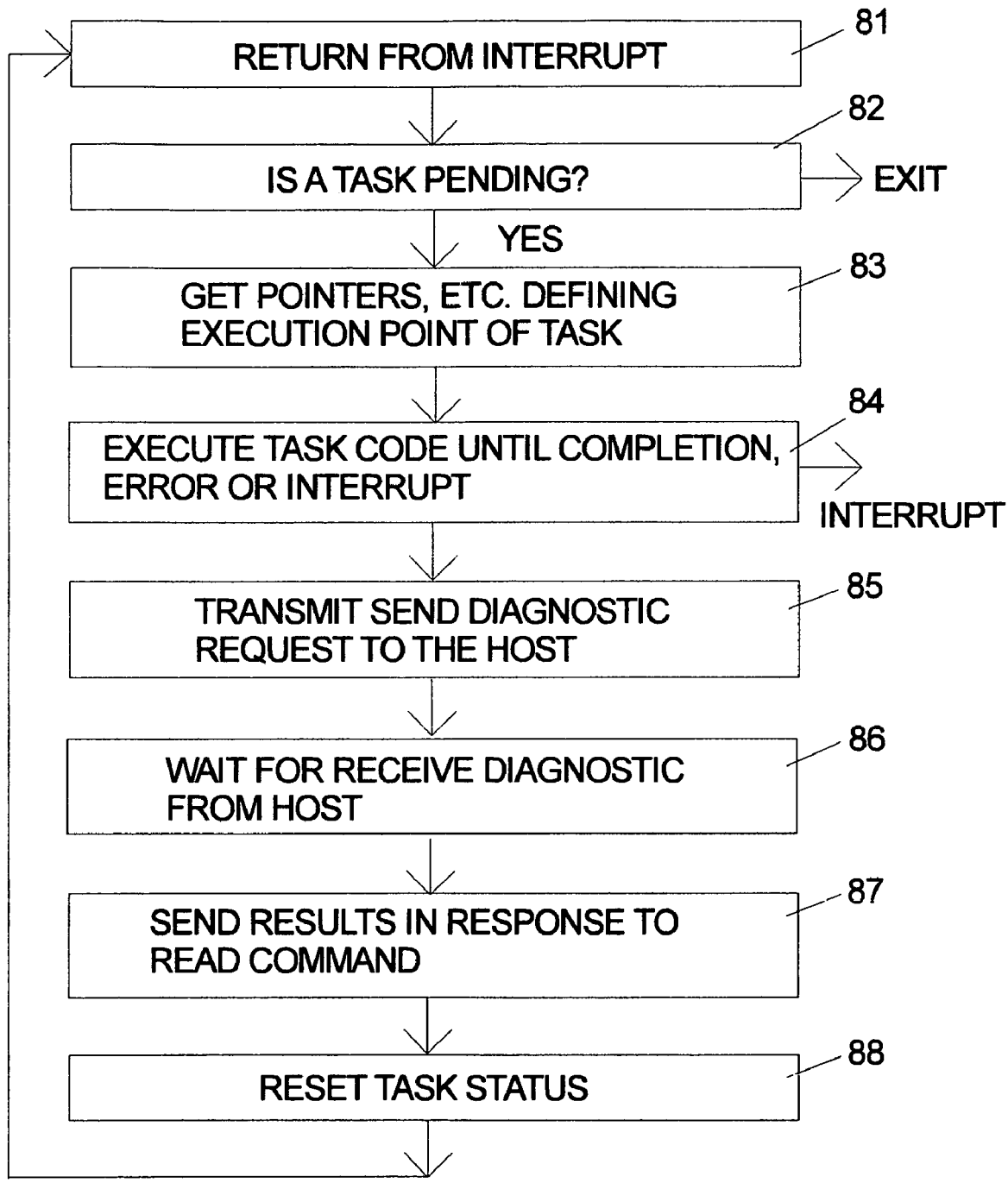
FIG. 6 is a flowchart illustrating the steps performed by an intelligent disk drive to execute a task according to the invention.

FIG. 6 is a flowchart illustrating the steps performed by an intelligent disk drive to execute a task according to the invention. The execution of various functions of the intelligent disk drive are generally interrupt driven as is the case for many systems having a plurality of real-time control and communications tasks. The definition of the task as shown in FIG. 3 is preferably interrupt driven. The execution of the distributed task is itself subject to being interrupted and upon return from an interrupt 81 the task control program preferably checks for a pending task 82. The status flags and pointers associated with the task will record whether a task is pending and sufficient information to allow the execution of the task to resume. This status information must be saved whenever a distributed task is interrupted (not shown) and it is reloaded when the task execution is resumed 83. The execution of the task continues until another interrupt occurs, an error is encountered or the task is completed 84. For an error or completion the task control program sends a SEND DIAGNOSTIC request to the host 85. The task control program waits for the host to send the RECEIVE DIAGNOSTIC command 86 and then sends the block of data for the error or completion to the host in response to the next read command 87. The task control program then resets the task status flags to indicate that no task is pending 88 and returns to normal interrupt driven processing.

The time for one rotation of the disk in current disk drives can be estimated as 4 to 10 milliseconds. Since microprocessors are available which operate on GHz clocks, times in milliseconds potentially allow time for significant processing to occur while the drive would otherwise be waiting on the mechanical components. In a preferred embodiment the execution of the task program occurs in parallel with the normal disk drive functions so that negligible delay, if any, occurs in delivering the data read from the drive.

The limitations on parallel computing system can be re-evaluated based on of the intelligent disk drive. For example, suppose there is a need to perform the computation A=B+C+D+E. In the first scenario this calculation is performed on a standard computer. The four numbers, B, C, D, and E are loaded from storage (the disk drive), the calculation is made, and the number A put back in storage. In a 15,000 RPM disk drive, the disks revolve one revolution in 4 ms., so the average latency is 2 ms. For this computation, 2 ms. is need (on the average) to get B, C, D, and E (assuming there in the same logical block). This ignores the time required to move the heads over the proper track. Another 2 ms. is needed to store the data, so the net time required, assuming an infinitely fast computer is 4 ms. If this same process is performed by two computers, a simplified parallel computer array, the scenario becomes: load B and C in one computer, D and E in the second, perform two computations in each computer, send the result of the second to the first computer, add the two temporary results, and finally store the result A, the time required is still 4 ms. Having two computers has not improved the speed of the computation because of the overhead of accessing the data on the disk drives. On the other hand if this computation is performed in an intelligent disk drive, it still might require 2 ms. to get to the start of the physical block containing B, C, D, and E, but once the computation is made, the result can be stored on the next physical block, eliminating most of the second 2 milliseconds.

In a system configuration, where there are a plurality of intelligent disk drives on the same BUS the intelligent disk drive can communicate directly with other the other intelligent disk drives. Therefore, in one advanced embodiment, the means for communicating to other intelligent disk drives could be made part of the task control program or it could be included in the task code.

Data Organization on the Disk for Optimizing Task Execution

An alternative embodiment will be described which uses the physical location of blocks on the surface of the disk (or multiple disks) that to optimize task execution and thereby mitigate one of the limitations for parallel processing. The intelligent disk drive has knowledge of the state of the rotational position of the disk pack that it is unavailable to any host. Moreover, attempts to make such hardware specific information available outside of the disk drive would be unproductive since the host has no practical way of using the information. The intelligent disk drive, however, can incorporate knowledge of the rotational position of the disk pack into its task execution with considerable advantage.

Figure 7:
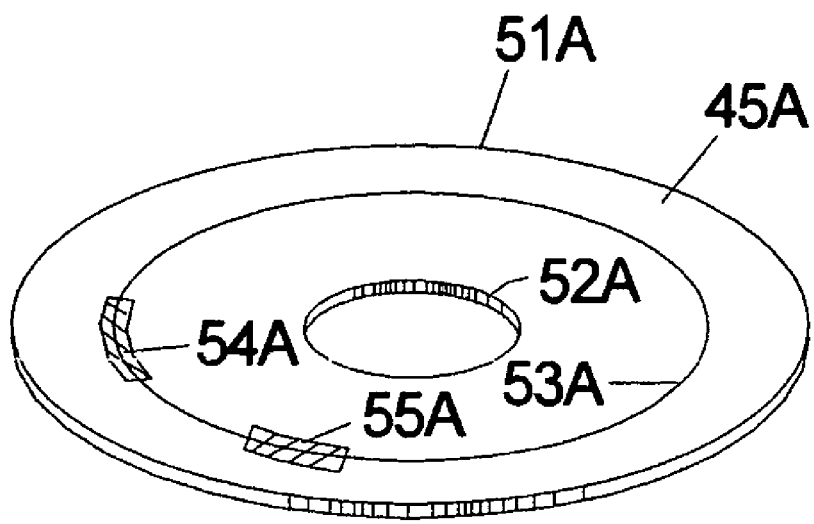
FIG. 7 is a symbolic illustration of data organization on a set of disks to optimize execution of tasks with alternative blocks according to the invention.
Figure 7:
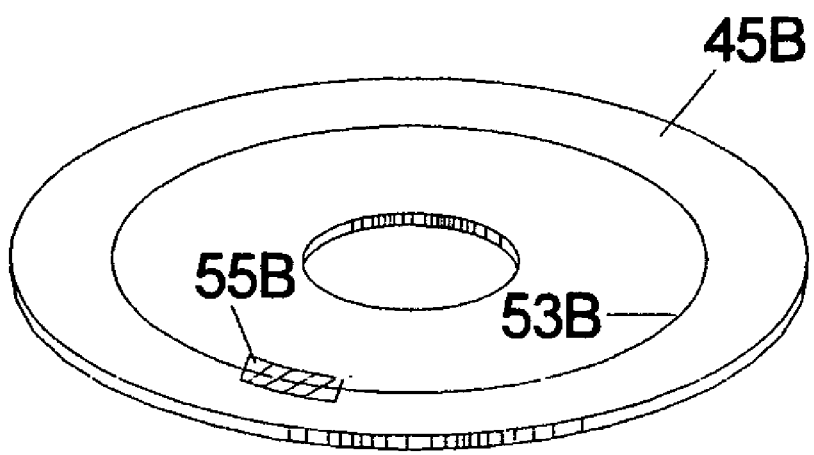
Figure 7:
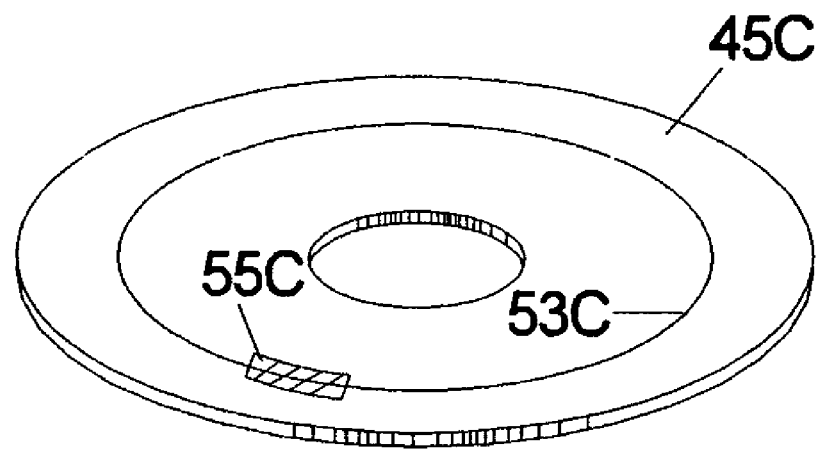

First, consider a simple program which fetches two sets of data such as matrices A and B, multiplies them, and stores the result. Referring to FIG. 7, the data for A and B are contained in the physical block 54A which is read as the disk rotates under the head (not shown). While the matrix multiplication is performed the disk pack rotates further so that the result can be stored in the next available physical block 55A which is shown on disk 45A, but could also be located on disk 45B or any other disk surface. No seek operation is required, so the typical disk latency time is greatly reduced.

In the following an embodiment will be described which is implemented with disk drive hardware which reads or writes from a single head at a time. In this embodiment data organization by rotational position is used to implement branching in the task program. Suppose, for example, a task program has a branching decision based on the value of a variable which can result in one of branches being taken in the program. Suppose further that each of the three branches requires different data or program code 55A, 55B, 55C to be read from the disk. FIG. 7 illustrates how the three sets of data or program code 55A, 55B, 55C can be stored on different disks or disk surfaces in an optimized way. The disk pack is this example rotates clockwise. By storing each of the alternative blocks of data or program code at a common physical (angular) position on different disk surface as shown, the task program can select which block to read by selecting which head to read from. Head selection is known as a "head switch" and is accomplished at very high speed by setting electronic register values. Thus, if the program decision results in the data in the block 55B being needed, then the program selects the head for the corresponding disk surface. Since each disk can have two surfaces, a simple head switch decision of this type can implement a 2*N branch where N is number of disks. With a small increase in rotational delay time, the blocks of data following the ones shown in FIG. 7 could be utilized to double the branching options and so forth.

In a more general approach, a program can be represented as a directed graph with nodes for branch points. There can be multiple branches from a particular node or the program may be linear without branches. The problem of optimal execution of the program using optimal placement of data blocks on the surfaces of the disks then resolves to a physical placement problem, very similar to the placement problem of placing logical circuits on a chip. A somewhat heuristic approach used in the past is to place the nodes on the physical blocks at random, then select a subset and try to place them in a new locations such that the distance between the nodes is minimized. In this case "distance" is the time required to access a physical block. Thus if node X is located in physical block K, the algorithm tries to move X to any available physical block, compute the "distance" at each placement, and if it finds a better location, node X is moved to that location. This process continues until the overall "distance" of the nodes from their connected nodes is minimized. There are other more complex algorithms that minimize the "distance" more optimally than the heuristic algorithm described, but of course they require more computational time and resources. If the same program is run multiple times in many intelligent disk drives, the time required to optimize the placement could be worthwhile.

Use of Simultaneous Read and Write Capability

Currently available disk drives can only read or write from a single head at a time, due to cost factors, as well as, the need to make micro-adjustments to keep the head on a track and compensate for physical variations around a single track. Variations between two comparable tracks one different disk surfaces can be sufficiently large to make it impossible to read or write simultaneously without the introduction of micro-actuators on each head which could adjust the position of the individual head to allow it to stay on a track which varies significantly from the similar track on another disk surface. Currently available disk drives have only one actuator for the entire set of heads, but disk drives with two actuators have been produced. Disk drives have also been produced which had a set of so-called "fixed heads" which accessed a single track in addition the standard moveable heads. Thus, it is possible to design disk drives with the capability to write and/or read from more than head simultaneously. The intelligent disk drive could be implemented with any of these variations to enhance the capability to execute the distributed or parallel task.

In the following, an embodiment of the intelligent disk drive which has the capability to read and write from more than one head simultaneously is described. One example of how this capability could be used with the task processing capability of the intelligent disk drive is in image transformation. Suppose that transformation is to be performed on a series of images is stored on a track on one disk in a disk pack. The task program can read the series of images as the disk rotates, perform the transformation and write the output to another head without having to move the actuator or actuators.

Figure 8:
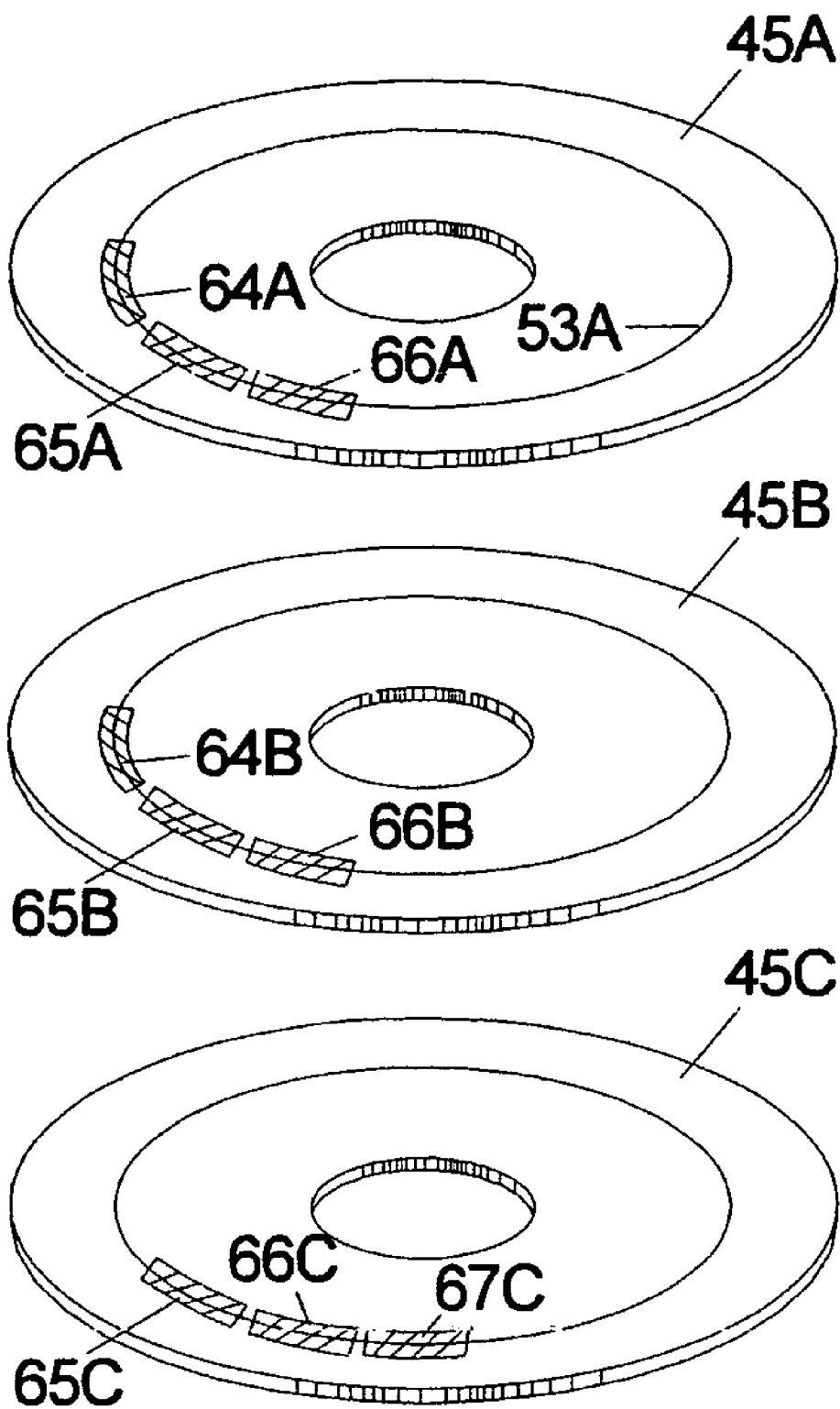
FIG. 8 is a symbolic illustration of data organization on a set of disks to optimize execution of tasks such as video merging according to the invention.

An example of the use of the data organization techniques for video scene merging will now be described with reference to FIG. 8. Suppose that in the production of video presentation such as a movie or a commercial, the final scene is to be constructed from several scenes that are recorded independently. For example, a background scene may be recorded on location, but the scene involving some of the actors may be recorded in a studio. The scenes have to then be combined to produce the final presentation. This can be represented as two series of frames $B_1$ through $B_n$ from the background scene and $S_1$ through $S_n$ a second scene. Since each block on a typical disk drive stores only about 512 bytes, even a single frame of video would typically require multiple blocks. Whether a frame requires one or more blocks on the disk, the process is basically the same. In FIG. 8 the frames for the background scene are sequentially stored in blocks 64A, 65A, 66A on disk 45A. The frames for the second scene as sequentially stored in blocks 64B, 65B, 66B on disk 45B. Preferably, this process would be implemented in an intelligent disk drive which could read from two heads simultaneously while writing the output to a third head. The frames from each input scene are preferably recorded on separate disk surfaces. If micro-actuators are used, the input streams can be physically aligned so that frames $B_1$ and $S_1$ can be retrieved simultaneously from different heads. If separate actuators are used, the input tracks could be placed anywhere including on the same disk surface in different tracks. As indicated previously the blocks of data become available for use after the entire block has been read and the ECC process has been performed. During the time period after frames $B_1$ and $S_1$ have completed the ECC process and while the next blocks are being read, the intelligent disk drive performs the merging task and the combined result ($B_1$ $S_1$) can then be written to a third head when the next block boundary is reached. In the micro-actuator implementation, the resulting combined video data would be located physically offset from the input data by one or more blocks. The disk pack is this example rotates clockwise, so the merged scene from 64A and 64B could be stored in block 65C. FIG. 8 shows the disk surfaces being on three separate disks, but even in the micro-actuator implementation two of the surfaces could be on a single disk. By using tracks on different disk surfaces which are physically aligned, no seek operation is required and the typical disk latency time is greatly reduced. If separate actuators are used, the need to seek to a different track is still avoided, since the respective heads can stream the input or output data to or from a track without having to move.

It is also possible to implement the video merge in an intelligent disk drive using disk drive hardware without simultaneous read or write capability. For example, read LBA 50 which contained frame 93 of one scene, then read LBA 51 which contained frame 93 of the second scene, quickly merge the two while LBA 52 is moving under the head, and then store the merged frame 93 in LBA 53.

Placement of Data on Disks

Although placement algorithms have been used extensively in module and LSI circuit placement, the current invention is a novel application since the objective is to optimize the performance of a task program executing in an intelligent disk drive that utilizes the stored data. As a simple example, consider a program which must load two physical blocks 54A, 55A located as shown in FIG. 7. If physical block 54A is required by the program before block 55A, the optimal placement is to locate both physical blocks 54A, 55A on the same track so that the head can fetch 54A then 55A immediately thereafter. If physical block 55A just precedes physical block 54A, nearly a complete revolution is required to access physical block 55A after physical block 54A is read. So clearly the placement of the data relative to the requirements of a program is critical to the speed of completing the task.

Now consider a somewhat more common program where two values, X and Y, are stored in two cells of a spread sheet, and the third cell Z represents the sum of the preceding two cells. When either of the first two cells changes, the result of the addition, cell Z also changes. In this case it does not matter whether X or Y is fetched first, but placing the data on diametrically opposite physical blocks on a track (or worse on different tracks) is clearly not an optimal placement. The two physical blocks should be placed as close as possible on the same track without regard to which block comes first. In the common usage of most spreadsheets, the complete spread sheet is loaded into high speed memory, the computations are performed, and the result is stored back in the disk drive. But in this case where the intelligent disk drive contains a processor which has knowledge of the physical location of all the data, accessing only the physical blocks that contain X, Y and subsequently Z can complete a simple operation faster than fetching the complete spread sheet (which may be very large).

Next consider the application of this concept to parallel or distributed computing. In many applications, such as missile targeting, the time required to complete the computation is very critical. If the targeting program can be contained in a very large spreadsheet, and the computations required by the spreadsheet somehow distributed over multiple intelligent disk drives, each disk drive can make a computation on its particular piece of the overall computation, and then report the its results to the host. For example, if the first intelligent disk drive makes the simple computation described above (A1+B1), the second one computes (A2+B2), and finally the n'th intelligent disk drive computes (An+Bn), the result can be reported by all the intelligent disk drives in at most a half rotation of the disk. If, on the other hand, the spreadsheet is very large in order to accommodate variations in wind, rain, temperature, incoming direction, missile type, and the like, the time required to fetch the complete spreadsheet and make the computation at the host level could be very large.

Assume a task program for the intelligent disk drive that requires various elements of data, and must store computed values or required flags. Here we assume that each element requires 512 bytes, so only one element is stored in a physical block of 512 bytes. The program has various decision points and paths in which either a read or write operation is required. The question is how to arrange the blocks on a disk surface such that the time required to complete the program is minimal given that the processor has to access the storage medium for each shaded block.

Next consider some of the physical constraints of the disk drive, in particular the track layout and the blocks within those tracks. We can represent three tracks on the surface with 28 physical blocks arbitrarily started at some position around the surface of the disk with the notation T:B where T is a track number from 1 to 3 and B is a block number from 1 to 28. The "distance" between any two physical blocks depends upon whether the physical block is on the same track or another track. The disk is revolving under the read/write head such that physical block 1 can passes under the head then physical block 2, etc. One way to represent a computer program is to form a directed graph of the program in which the decisions are nodes with two or more paths to other nodes. This problem is somewhat more difficult than the usual placement problem because the distance from say block 1:5 to block 1:6 is very short, but the distance from block 1:6 back to block 1:5 is a complete revolution of the disk. We need to construct a matrix describing the distances from all the possible locations to all the other possible locations. Each of these possible locations has a distance to each of the other possible locations, and the distance from location n to location m will probably be different that the distance from m to n. For our example, the forward distance to the next physical block can be on the order of 5 microseconds whereas the single track seek time can be as high as 5 ms. The backward distance to the next physical block is also on the order of 5 ms since a complete revolution is required to get back to the preceding physical block.

Figure 9:
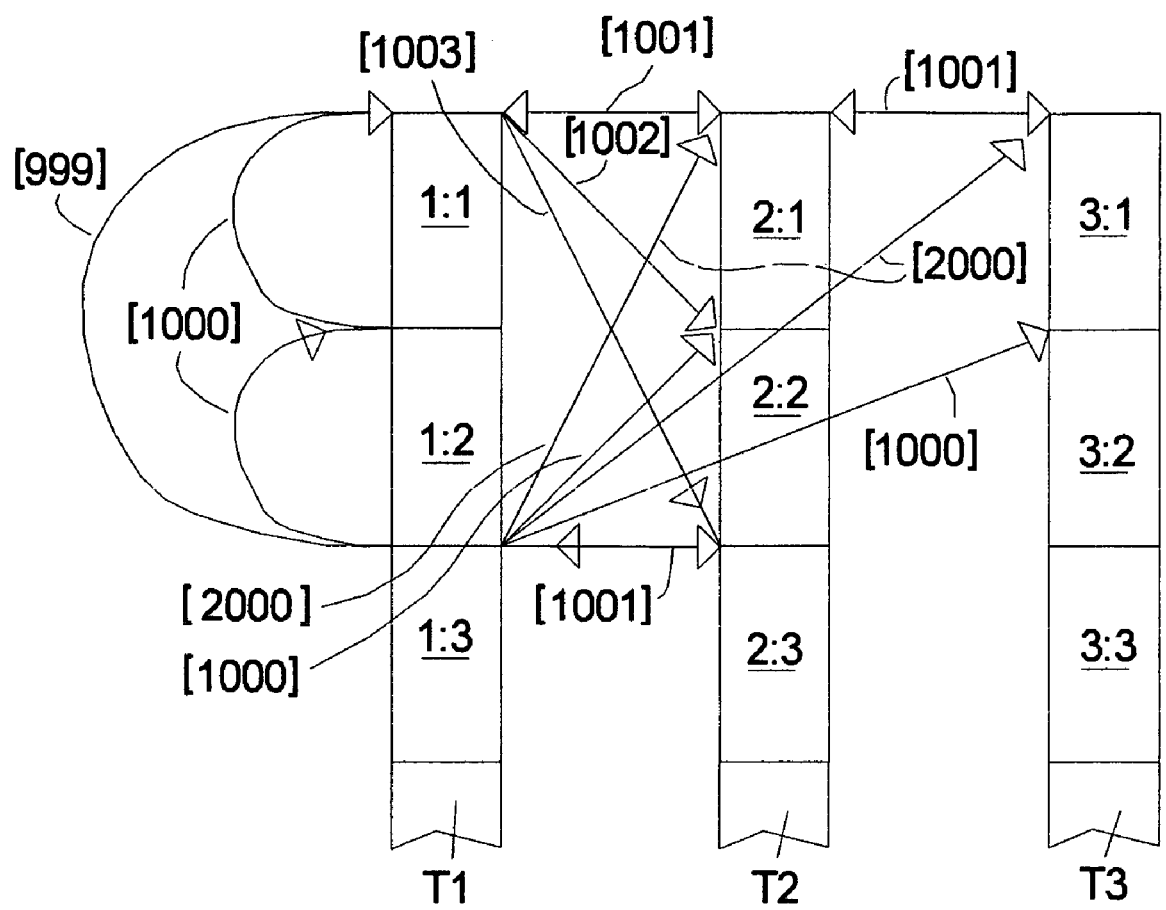
FIG. 9 is a first symbolic illustration of data organization on a set of disks used to illustrate a method of optimizing the execution of tasks according to the invention.

For example, consider the case shown in FIG. 9 where there are only three tracks T1, T2, T3 each with only three physical blocks. The start of the three physical blocks in track T1 are 1:1, 1:2, and 1:3, etc. Assume that it takes 1 unit of time to move the head from one physical block in a track to the next, but it takes 1000 units of time before the preceding physical block moves under the head. The results of these assumptions are shown in the first track (blocks 1, 2, and 3). Furthermore, assume that it requires 1000 units of time to perform a single (or double) track seek from block 1:3 to block 2:2. Then, to get to block 2:3, it takes one more unit of time, or a total of 1001 units of time. To move from 1:3 to 2:1, you must first seek from the first track to the second (1000 units of time), but that puts you in block 2:3, so you must then wait 1000 time units before 2:1 comes back under the head. If we put all these assumptions in a matrix form, the result is Table 1.

Extending the notation, we can use (T1:B1)-(T2:B2) to refer to the values in the matrix for the time to go from T1:B1 to T2:B2. Thus, the value of (1:3)-(3:3) is 1003. Now suppose we have a node located in location 1:1, another located in 1:2, and a connection between the two that is directed from 1:1 to 1:2. We can then formulate a connection matrix of binary with a single 1 in the appropriate position indicating a connection. Then summing the product of an element by element product of each cell, we see the time distance is 1 unit. If, on the other hand, the first node was in location 1:2 and the second node was in location 1:1, the sum of all the cell products is 1000. Clearly, if we were trying to choose the best arrangement, we would choose the first since the total distance (in time) was only 1 unit rather than 5.

Continuing our simple example, consider a very simple program that requires three physical blocks, and that we have initially randomly distributed the data A, B, C in physical blocks 3:1, 1:2 and 3:3 respectively. Furthermore, assume directions the blocks will be required in the order A, B, C. The algorithm proceeds by assuming that the location for A at 3:1 and C at 3:3 are fixed and then assess all the distances if B is located in the open positions 1:1, 1:2, 1:3, 2:1, etc. For example, if B is located in 1:2, then the connection matrix for the current location of "B" will have 1 at (3:1)-(1:2) and (3:3)-(1:2) and the total time value is then 2002. Similarly, we can see the time-distance for every unused location in the right hand column. The minimum of 1001 if "B" is located in physical block 3:2.

This example illustrates several points of interest. First, we have reached the best solution using the simple algorithm described above, although it is clear that a much better arrangement is to exchange the locations of B and C. This can be easily added to the algorithm by simply picking two connected nodes and trying to switch the locations. The example also illustrates the point that there may be a local minimum which is not particularly close to the absolute minimum. In addition, the initial random locations is very important. Consequently, in an automated placement technique, several different random locations are usually chosen. Of course, location problems can exist which have no solution, but in a practical application an algorithm which handles the actual problems encountered is nevertheless useful.

Use of Head Switching

The preceding discussion assumed that all the available physical block locations are on the same surface. However, in practice, almost all commercially available disk drives have at least two surfaces, and some have ten or twelve surfaces. In our previous example where we considered three tracks on a single surface, but without loss of generality, we can assume those three tracks are on three surfaces as shown in FIG. 7. If the three tracks are on the same cylinder, they are much closer in the sense of access time than the three blocks we considered earlier. If appropriately spaced around the track, the time required to access physical block 55B from physical block 55A is only the time required for a head switch and potentially the small amount of time required to re-position the head over track 53B rather than

TABLE 1

|  | 1:1 | 1:2 | 1:3 | 2:1 | 2:2 | 2:3 | 3:1 | 3:2 | 3:3 | Total |
|---|---|---|---|---|---|---|---|---|---|---|
| 1:1 | 0 | 1000 | 999 | 1001 | 1000 | 2000 | 1001 | 1000 | 2000 | 3001 |
| 1:2 | 1 | 0 | 1000 | 1002 | 1001 | 1000 | 1002 | 1001 | 000 | 2002 |
| 1:3 | 2 | 1 | 0 | 1003 | 1002 | 1001 | 1003 | 1002 | 1001 | 2004 |
| 2:1 | 1001 | 1000 | 2000 | 0 | 1000 | 999 | 1001 | 1000 | 2000 | 3001 |
| 2:2 | 1002 | 1001 | 1000 | 1 | 0 | 1000 | 1002 | 1001 | 1000 | 2002 |
| 2:3 | 1003 | 1002 | 1001 | 2 | 1 | 0 | 1003 | 1002 | 1001 | 2004 |
| 3:1 | 1001 | 1000 | 2000 | 1001 | 1000 | 2000 | 0 | 1000 | 999 | occ. |
| 3:2 | 1002 | 1001 | 1000 | 1002 | 1001 | 1000 | 1 | 0 | 1000 | 1001 |
| 3:3 | 1003 | 1002 | 1001 | 1003 | 1002 | 1001 | 2 | 1 | 0 | occ. | track 53A. With the use of micro-actuators, the time required to reposition the head can be virtually zero.

Figure 10:
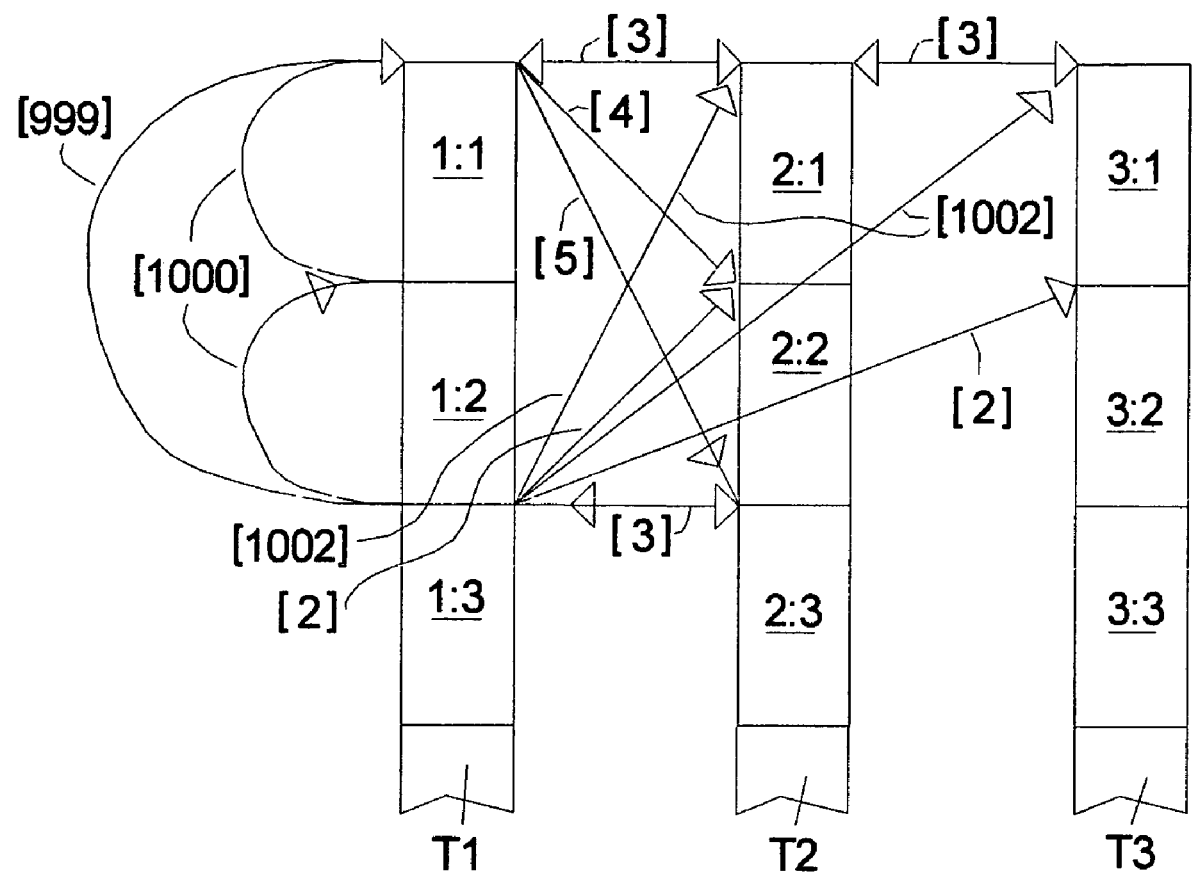
FIG. 10 is a second symbolic illustration of data organization on a set of disks used to illustrate a method of optimizing the execution of tasks according to the invention.

We have assumed that moving from one physical block to the next along a track required 1 unit of time whereas the time required to access the next track was 1000 units of time. We now assume that the time required to do a head switch as discussed above could be as little as 2 units of time. (We will discuss later the case where the "head switch" time is virtually zero). This arrangement only requires a change to the distances (shown brackets) between physical blocks as shown in FIG. 10. All the placement techniques discussed earlier still apply to the "head switch" case where multiple surfaces are used; only the distances have been modified.

Figure 11:
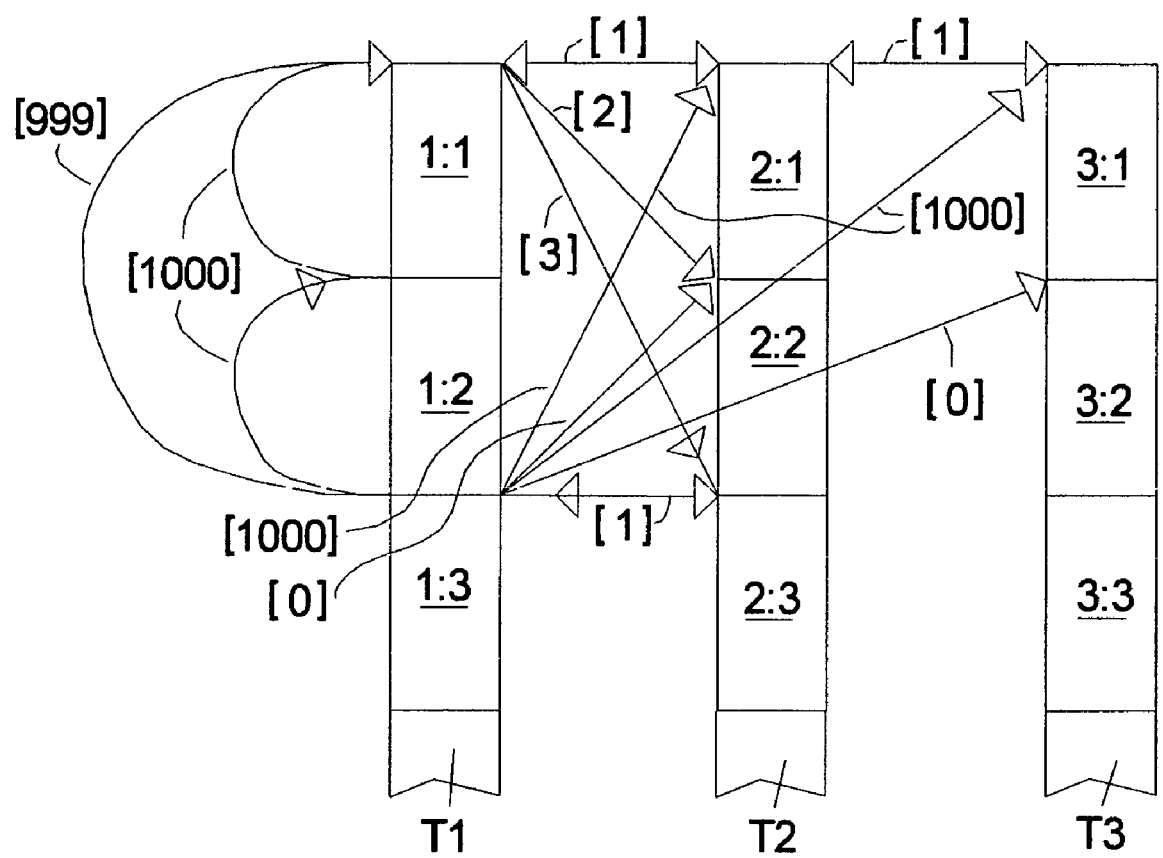
FIG. 11 is a third symbolic illustration of data organization on a set of disks used to illustrate a method of optimizing the execution of tasks according to the invention.

Extending the concept of micro-actuators still further, it is possible that some or all of the tracks in a particular cylinder are on track simultaneously. In this case, the time required to do a head switch is virtually zero. If, in addition to the possibility of being on track at the same time, multiple channels can be included all tracks can be accessed at the same time. In this case, instead of having a single flow of data, a ten surface disk drive can provide ten steams of data simultaneously. However, even in this extreme case, the placement algorithm is still applicable. The access time diagram would then be as shown in FIG. 11. Notice that the time required to access block 2:2 from block 1:3 is 0 (as long as it's much shorter than the time to move from one block, such as block 1, to the succeeding block on the track.

Multiple Node Optimization

For ease of discussion in the preceding description, we have only considered moving one node at a time. In practice it is possible to move several nodes at the same time as long as the nodes are not connected. For example, in the previous three-node example, we could test moving nodes A and C at the same time since they are not connected. There are a number of algorithms in the literature that can identify sets of unconnected nodes in a graph as candidates to place simultaneously.

One can see from the previous discussion that even with a relatively small optimization problem, the computational requirements can expand rather quickly. If we consider the optimization of all the data in a 400 Gb disk drive, the problem can become overwhelming. In this case we apply the idea of first optimizing small disjoint parts of the overall program, and then optimizing the placement of those blocks as a second placement algorithm. Block optimization for large problems have been discussed extensively in the literature.

Host Optimization

In some cases it is more convenient to optimize the placement at the host level rather than the drive level. For example several disk drives may be working in parallel on different data, but with the same program. Rather than optimizing the placement for each disk drive independently at the drive level, it might be more advantageous to optimize the placement at the host level, and subsequently send the resultant placement to the disk drive. To accomplish this, we might define a new interface command code that allows the host to communicate the appropriate physical locations to the disk drive. The host can use the techniques described earlier for deciding where to store the blocks.

For example, if we assume a SCSI interface, we might transfer the physical locations to the disk drive using a hand shaking technique described earlier and shown in FIG. 3. In this case, the host 20 sends a message to the intelligent disk drive 30 that indicates that the next command is a set of data that should be stored in a format defined in the data. The predetermined format for defining the storage locations would then indicate to the disk drive that the file contains not only the data, but either the absolute physical locations of the data or the relative locations of the data. A simple table at the beginning of the data/code block containing pairs of entries could be sufficient. The first entry in each pair could specify an absolute location by including a surface, track and block identifier (S:T:B). The second entry in each pair could specify the start and end points of the data to be stored. The location could also be a relative location such that the following locations only relate to the first location.

In either case, the intelligent disk drive may have to move some of the data stored in the disk drive to other locations such that it can clear sufficient space to accommodate the new placement. In other cases, the intelligent disk drive design could include reserved disk space to accommodate a new absolute or relative placement command.

Initially the host does not know what the available space is on the disk drive so it has to determine which locations are available. So the first of a series of general commands would be a command to query the intelligent disk drive for a list of the available space on the disks.

At the host level, before the program is laid out, the host only has a general idea of how much space is required, e.g. somewhat more than the size of the sum of the data file and the program file. If we determine that not enough space is available, or if the space is not particularly contiguous, the host will try to defragment the disk drive and recheck for free space. Therefore, a command for the intelligent disk drive to defragment the disk should be implemented. Assume at some point we decide to try to place the data on the available space as described earlier when the internal processor was performing the task. Now that the host has made sufficient space, the exact locations of that space need to be determined. Therefore, a command should be implemented to request the addresses of available locations. Once the available locations are known the host must reserve those locations while it is busy assembling the data as required for the placement technique. Therefore, a command to reserve the locations should be implemented. At this point the host can continue with the placement algorithm as described earlier, but only at the host level. Once that is accomplished, the host will need to store that result on the disk drive in the locations specified. Another command is sent from the host to the disk drive to inform the disk drive that the next storage request will be data that is to be stored in specific locations. This command will flag the intelligent disk drive for an incoming file with locations being designated by the host. The disk drive now knows that the host is going to send a file with imbedded data in a predetermined format that indicates exactly where the data is to be stored. In the simplest case, the incoming file could have two pieces of data associated with each physical block; the data for the physical block, and the physical block location where the data is to be stored.

The invention has been described with respect to particular embodiments, but other uses and applications for the techniques according to the invention will be apparent to those skilled in the art.

The invention claimed is:

1. A method of operating a disk drive comprising the steps of:
   receiving a task definition command from a host computer which defines a task for the disk drive, the task requiring first and second alternative blocks of information during execution;
   storing at least first and second alternative blocks of information at first and second physical locations on first and second disk surfaces respectively, the first and second physical locations being selected to optimize execution of the task;

executing the task to determine whether the first or the second alternative block of information is needed; and reading the first or second alternative block of information.

2. The method of claim 1 wherein the first and second physical locations are located on first and second disk surfaces at a common angular and radial position and the step of reading the first or second alternative block of information further comprises selecting a head for the first disk surface to read the first alternative block or selecting a head for the second disk surface to read in the second alternative block.

3. The method of claim 1 wherein the task is executed as an interruptible process using the data for the task, and the method further comprises storing task status and pointers when an interrupt occurs and resuming execution of the task using the stored task status and pointers when the interrupt has been processed.

4. The method of claim 1 further comprising the steps of:
signaling the host that the task has completed;
transmitting results of the task to the host; and
resetting task status flags to indicate that no task is pending after the task has completed.

5. The method of claim 4 wherein the step of signaling further comprises means for sending a request for a diagnostic inquiry.

6. The method of claim 4 wherein the step of transmitting further comprises responding to a diagnostic inquiry from the host by sending information on the results of the task.

7. The method of claim 1 wherein the step of receiving the task definition command further comprises using a logical block identifier in the task definition command for previously written data as the source for the task.

8. The method of claim 1 wherein step of receiving a task definition command further comprises accepting the task as data in a write command which follows a diagnostic command.

9. A method of operating a disk drive comprising the steps of:
receiving a task definition command from a host computer, the task including processing a first series of units of input information sequentially stored on a first track to generate a series of units of output information; and
executing the task by repeating the steps of reading a first unit in the first series of units of input information from the first track using a first head positioned over the first track, generating a first unit of the series of units of output information and writing the first unit of the series of units of output information on a second track using a second head without moving the first head.

10. The method of claim 9 wherein the first head is attached to a first actuator and the second head is attached to a second actuator.

11. The method of claim 9 wherein the first and second heads are attached to first and second micro-actuators respectively and are attached to a common actuator.

12. The method of claim 9 wherein the step of writing the first unit of the series of units of output information occurs in parallel with the step of reading a second unit in the first series of units of input information.

13. The method of claim 9 wherein the task further includes processing a second series of units of input information in combination with the first series of units of input information and the method further comprises storing second series of units of input information on a third disk surface with corresponding units in the first and second series of units of input information being stored at a common angular position so that corresponding units in the first and second series can be read simultaneously from the first and second and third disk surfaces as the disks rotate.

14. The method of claim 9 wherein the task definition command includes a specification of a task program code and a specification of data for the task program.

15. The method of claim 9 wherein the task program is executed as an interruptible process using the data for the task, and the method further comprises storing task status and pointers when an interrupt occurs and resuming execution of the task program using the stored task status and pointers when the interrupt has been processed.

16. The method of claim 9 further comprising the steps of:
signaling the host that the task program has completed;
transmitting results of the task program to the host; and
resetting task status flags to indicate that no task program is pending after the task program has completed.

17. The method of claim 16 wherein the step of signaling further comprises means for sending a request for a diagnostic inquiry.

18. The method of claim 16 wherein the step of transmitting further comprises responding to a diagnostic inquiry from the host by sending information on the results of the task program.

19. The method of claim 9 wherein the step of receiving the task definition command further comprises using a logical block identifier in the task definition command for previously written data as the source for the task program.

20. The method of claim 9 wherein step of receiving a task definition command further comprises accepting the task program as data in a write command which follows a diagnostic command.

21. A disk drive comprising:
a processor and a memory for storing data and a program for the processor;
a task control program executable by the processor loaded into the memory, the task control program including means for accepting a task definition command from a host computer, the task definition command including a specification of a task program of code executable by the processor and a specification of data for the task program;
means for executing the task program as an interruptible process using the data for the task, the means for executing the task program including means for storing task status and pointers when an interrupt occurs and resuming execution of the task program when an interrupt has been processed;
means for storing at least first and second alternative blocks of information on first and second disk surfaces, the first and second alternative blocks being stored at a common angular position;
means for executing the task to determine whether the first or the second alternative block of information is needed;
means for selecting a head for the first disk surface to read the first alternative block or selecting a head for the second disk surface to read in the second alternative block based on the step of executing the task; and
means for signaling the host that the task program has completed.

22. The disk drive of claim 21 wherein means for accepting a task definition command further comprises means for accepting the task program as data in a write command which follows a diagnostic command.

23. The disk drive of claim 21 wherein the means for signaling further comprises means for sending a request for a diagnostic inquiry.

24. The disk drive of claim 21 wherein the means for accepting a task definition command further comprises means for using a logical block identifier for previously written data as the source for the task program.

25. A disk drive comprising:
- a processor and a memory for storing data and a program for the processor;
- a task control program executable by the processor loaded into the memory, the task control program including means for accepting a task definition command from a host computer, the task definition command including a specification of a task program of code executable by the processor and a specification of data for the task program;
- means for executing the task program as an interruptible process using the data for the task, the means for executing the task program including means for storing task status and pointers when an interrupt occurs and resuming execution of the task program when an interrupt has been processed;
- means for executing the task by repeating the steps of reading a first unit in the first series of units of input information from the first track using a first head positioned over the first track, generating a first unit of the series of units of output information and writing the first unit of the series of units of output information on a second track using a second head without moving the first head; and
- means for signaling the host that the task program has completed.

26. The disk drive of claim 25 further comprising first and second actuators and wherein the first head is attached to a first actuator and the second head is attached to a second actuator.

27. The disk drive of claim 25 further comprising first and second micro-actuators and wherein the first and second heads are attached to first and second respectively and are attached to a common actuator.

28. The disk drive of claim 25 wherein means for accepting a task definition command further comprises means for accepting the task program as data in a write command which follows a diagnostic command.

29. The disk drive of claim 25 wherein the means for signaling further comprises means for sending a request for a diagnostic inquiry.

30. The disk drive of claim 25 wherein the means for accepting a task definition command further comprises means for using a logical block identifier for previously written data as the source for the task program.

* * * * *